US009028943B2

(12) United States Patent
Rau et al.

(10) Patent No.: US 9,028,943 B2
(45) Date of Patent: May 12, 2015

(54) METHOD FOR IMPROVING THE SURFACE APPEARANCE AND PROCESSING OF PLASTICS RECOVERED FROM DURABLE GOODS

(71) Applicant: MBA Polymers, Inc., Richmond, CA (US)

(72) Inventors: Ronald C. Rau, Gringley-on-the-Hill (GB); Brian L. Riise, San Ramon, CA (US); Gary Christopher Stevens, Surrey (GB); Henryk Herman, Surrey (GB)

(73) Assignee: MBA Polymers, Inc., Nottinghamshire (GB)

( * ) Notice: Subject to any disclaimer, the term of this patent is extended or adjusted under 35 U.S.C. 154(b) by 0 days.

(21) Appl. No.: 14/067,442

(22) Filed: Oct. 30, 2013

(65) Prior Publication Data

US 2014/0163152 A1 Jun. 12, 2014

Related U.S. Application Data

(60) Provisional application No. 61/720,137, filed on Oct. 30, 2012.

(51) Int. Cl.
| | | |
|---|---|---|
| B32B 3/02 | (2006.01) |
| B32B 27/32 | (2006.01) |
| B32B 15/04 | (2006.01) |
| B32B 27/06 | (2006.01) |
| C08G 73/10 | (2006.01) |
| C07F 15/04 | (2006.01) |
| C08K 3/18 | (2006.01) |
| C08K 3/08 | (2006.01) |
| C08L 23/06 | (2006.01) |
| B29B 17/02 | (2006.01) |
| C08J 11/04 | (2006.01) |
| B29B 17/00 | (2006.01) |

(52) U.S. Cl.
CPC ............ *C08L 23/06* (2013.01); *B29B 17/02* (2013.01); *C08J 11/04* (2013.01); *B29B 17/0026* (2013.01); *B29B 2017/0203* (2013.01); *B29B 2017/0244* (2013.01)

(58) Field of Classification Search
CPC .. C08B 26/006; C08B 18/08; C08B 40/0085; C08K 3/22; Y10S 264/49
USPC ............ 428/220, 457, 500, 480, 86; 524/439, 524/430, 323, 328
See application file for complete search history.

(56) References Cited

U.S. PATENT DOCUMENTS

| 4,830,188 A | 5/1989 | Hannigan |
| 7,802,685 B2 | 9/2010 | Allen |
| 2006/0219276 A1 | 10/2006 | Bohnert |

(Continued)

FOREIGN PATENT DOCUMENTS

| DE | 19510923 | 10/1996 |
| DE | 19643603 A1 | 4/1998 |

(Continued)

OTHER PUBLICATIONS

International Search Report and Written Opinion for PCT/US2013/067530 mailed Jan. 7, 2014, 9 pages.

*Primary Examiner* — William Cheung
(74) *Attorney, Agent, or Firm* — Fish & Richardson P.C.

(57) ABSTRACT

A method is described for improving the processability and surface appearance of products containing plastic recovered from waste plastic material mixtures.

12 Claims, 2 Drawing Sheets

Regression coefficient spectrum of HDPE samples spectra response regressed against the added Calaxol concentration (0-3 wt %)

(56) References Cited

U.S. PATENT DOCUMENTS

| | | |
|---|---|---|
| 2009/0281203 A1 | 11/2009 | Riebel |
| 2011/0244172 A1* | 10/2011 | Wright et al. .................. 428/86 |
| 2013/0032167 A1 | 2/2013 | Riise |

FOREIGN PATENT DOCUMENTS

| | | |
|---|---|---|
| EP | 1849822 B1 | 9/2008 |
| JP | S49-128542 | 12/1974 |
| JP | S51-047180 B1 | 12/1976 |
| WO | WO9215640 A1 | 9/1992 |
| WO | WO0121373 A1 | 3/2001 |
| WO | WO0183112 A1 | 11/2001 |
| WO | WO03086733 A1 | 10/2003 |
| WO | WO03087215 A1 | 10/2003 |
| WO | WO2008017843 A1 | 2/2008 |

* cited by examiner

FIG. 1: Regression coefficient spectrum of HDPE samples spectra response regressed against the added Calaxol concentration (0-3 wt %)

METHOD FOR IMPROVING THE SURFACE APPEARANCE AND PROCESSING OF PLASTICS RECOVERED FROM DURABLE GOODS

CROSS-REFERENCE TO RELATED APPLICATIONS

This application claims priority to U.S. Provisional Application No. 61/720,137, filed Oct. 30, 2013, which is incorporated by reference in its entirety.

TECHNICAL FIELD

This disclosure relates to the use of an additive (e.g., Calcium Oxide) for improving the surface appearance and melt processing of plastics recovered from streams of waste plastics and other materials.

BACKGROUND

Products made from or incorporating one or more plastics are a part of almost any work place or home environment. Generally, the plastics that are used to create these products are formed from virgin plastic materials. That is, the plastics are produced from petroleum or natural gas and are not made from existing plastic materials. Once the products have outlived their useful lives, they are generally sent to waste disposal or a recycling plant.

Recycling plastic has a variety of benefits over creating virgin plastic from petroleum. Generally, less energy is required to manufacture an article from recycled plastic materials derived from post-consumer and post-industrial waste materials and plastic scrap (collectively referred to in this specification as "waste plastic material"), than from the comparable virgin plastic. Recycling plastic materials obviates the need for disposing of the plastic materials or product. Further, less of the earth's limited resources, such as petroleum and natural gas, are used to form virgin plastic materials.

When plastic materials are sent to be recycled, the feed streams rich in plastics may be separated into multiple product and byproduct streams. Generally, the recycling processes can be applied to a variety of plastics-rich streams derived from post-industrial and post-consumer sources. These streams may include, for example, plastics from office automation equipment (printers, computers, copiers, etc.), white goods (refrigerators, washing machines, etc.), consumer electronics (televisions, video cassette recorders, stereos, etc.), automotive shredder residue (the mixed materials remaining after most of the metals have been sorted from shredded automobiles and other metal-rich products "shredded" by metal recyclers), packaging waste, household waste, building waste and industrial molding and extrusion scrap.

Different types of plastic parts are often processed into shredded plastic-rich streams. The variety of parts can vary from a single type of part from a single manufacturer up to multiple families of part types. Many variations exist, depending on at least the nature of the shredding operation. Plastics from more than one source of durable goods may be included in the mix of materials fed to a plastics recycling plant. This means that a very broad range of plastics may be included in the feed mixture. Some of the prevalent polymer types in the waste plastic materials derived from the recycling of end-of-life durable goods are acrylonitrile-butadiene-styrene (ABS), high impact polystyrene (HIPS), polypropylene (PP), polyethylene (PE) and polycarbonate (PC), but other polymers may also be present.

Recycled plastic materials, however, can sometimes suffer from unwanted odors, difficulties with melt processing, foaming of the extrudate, and poor surface appearance. The poor surface appearance may be manifested by splay, silver streaking, surface roughness or other cosmetic problems. End users require products meeting their requirements for odor, volatiles emissions and surface appearance, but market and legislative forces are encouraging manufacturers to incorporate post-consumer plastics into their products. In order to satisfy these requirements, it is important to identify and implement appropriate methods to avoid unwanted odors, avoid difficulties with melt processing, avoid foaming of the extrudate, and improve surface appearance.

SUMMARY

A method is described for improving the processability and surface appearance of products containing plastic recovered from waste plastic material mixtures.

DETAILED DESCRIPTION

Figure 1:
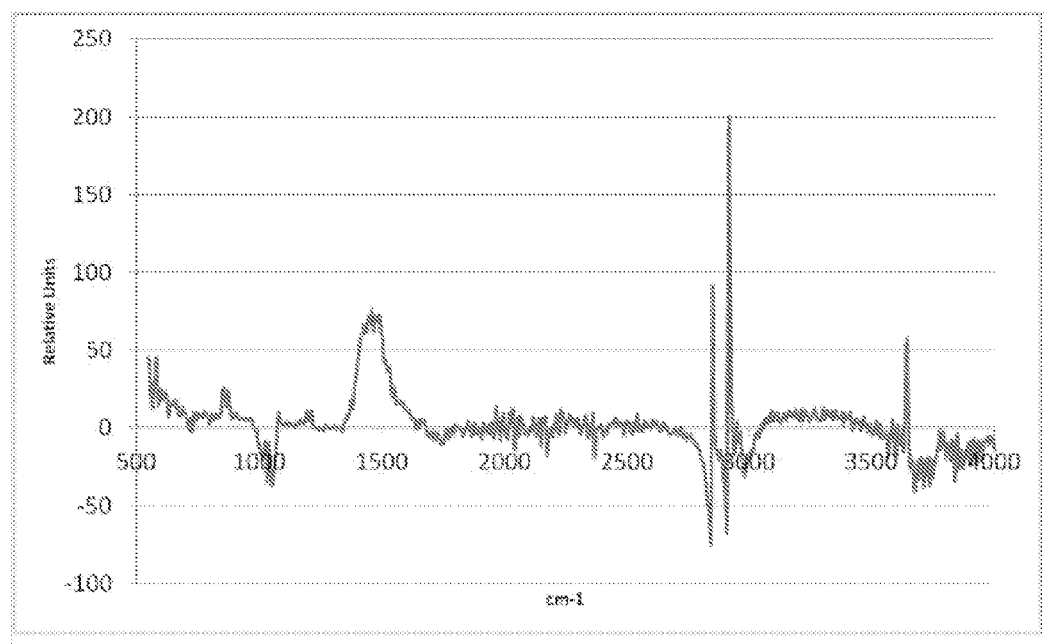
FIG. 1—Regression coefficient spectrum of HDPE samples spectra response regressed against the added Calaxol concentration (0-3 wt %)

This application describes methods for reducing the porosity of and improving the processability and surface appearance of products containing plastic recovered from waste plastic material mixtures. In some embodiments, the processability and surface appearance of the products containing recycled plastic can be improved by adding calcium oxide (CaO) either as a powder or as a masterbatch in a carrier polymer. In some embodiments, the CaO can be added in combination with other additives. In some embodiments, the processability and surface appearance of the products containing recycled plastic can be improved by adding CaO in addition to processes such as drying, vacuum devolatilization, melt filtration, or cleaning steps that also reduce the amounts of semi-volatile organic chemicals in the plastic.

Accordingly, in the following, we describe methods for the improving the processability and surface appearance of products containing plastic recovered from waste plastic material mixtures.

A recycling plant for the recovery of plastics from waste plastic material mixtures such as those mixtures recovered from durable goods typically includes a number of process steps. For example, U.S. Pat. No. 7,802,685, which is hereby incorporated by reference, describes various sequences of various process steps for the removal of non-plastics and the separation of the various plastic types from streams containing mixtures of plastics from durable goods. The methods, systems, and devices described herein can be used in sequence with or in substitution for the various process steps described in U.S. Pat. No. 7,802,685. These sequences of processes apply to both streams derived from durable goods and to streams of packaging materials, bottles or other mixtures rich in plastics. The process can include the use of one or more size reduction steps performed on a plastics-rich mixture from durable goods. The feed mixture can be shredded material from which some metal has been removed. The durable goods themselves can be size reduced two or more times prior to extrusion.

A mixture rich in plastic material can be processed through size reduction equipment one or more times. The size reduction steps may include rotary grinding, a hammermill, shredding, granulation, or any other size reduction processes known by those skilled in the art.

The mixture rich in plastic flakes can be processed through one or more density separation processes. These density separation processes can occur in water at a density cut point of 1.0, or in aqueous salt solutions or aqueous suspensions of solid particles with density cut points greater than 1.0, for example as described in U.S. Pat. No. 7,802,685. The plastic-rich mixture may also contain rubber, wood and other non-plastics. The flakes can range in size from around 1 mm to around 50 mm, although the process works best when the particles are between about 2 mm and about 10 mm. Size reduction, in some embodiments, can precede the density separation processes. In some embodiments, size reduction can also follow the density separation process to create a final flake size between about 2 mm and about 10 mm.

The density separations may be carried out in any of the types of density separation equipment. For example, hydrocyclones can efficiently separate materials of different densities based on the high centrifugal forces present in the liquid slurry swirling inside a cyclone.

An appropriate rinsing step can be used after elevated density separations. The rinsing step may contain, for example, small water jets that are designed to rinse the majority of the salt solution or suspended particles off the materials in the plastic-rich flake mixture.

The mixtures can also be dried in a controlled manner after the density separations. Flake materials tend to adhere to surfaces if they are overly damp or wet, and this can result in poor separation performance for some of the processes described herein.

Two product streams can be recovered from each density separation process. One or both of these product streams may be further processed to recover high purity plastics. Each product from the density separation often contains two or more types of plastics and small amounts of non-plastics. Such a product therefore requires further purification steps, as described in U.S. Pat. No. 7,802,685. These purification steps typically include processes relying on a narrow surface to mass distribution which are preceded by surface to mass control operations.

After purification of the plastics by type (and also sometimes grade), the material can be melt compounded. The flake to be melt compounded can be blended prior to extrusion in order to improve product uniformity. The product from melt compounding can be pellets, sheet or other profile shape (e.g. a board).

Plastics recovered from mixtures of durable goods, and especially mixtures from end-of-life vehicles (ELV), can contain residual organic materials that should ideally be removed from the flakes prior to their formation into pellets or molded part. Such residual organics can include, for example, residual fuels from automobile fuel tanks, residue from radiators, residue from windshield wiper fluid containers, adhesives, or polychlorinated biphenyls (PCBs).

Automobile fuel tanks are often made of plastics and can contain layers of high density polyethylene (HDPE) along with barrier materials such as ethylene vinyl alcohol (EVOH, which is a copolymer containing ethylene and vinyl alcohol repeat units), polyamides or other barrier materials, and adhesives to attach the barrier material to the HDPE. The plastics from fuel tanks can contain gasoline and diesel fuels on the plastic surface as well as gasoline and diesel fuels that have absorbed into the plastic over the life of the automobile.

Plastics from durable goods, especially those derived from ELV streams, can contain PCBs at concentrations higher than allowed by some customers or by the legislation of some countries. PCBs can be found in these streams because automobile shredders sometimes process electrical transformers or other equipment that can contain small amounts of PCBs.

Other undesirable organic materials may also be present in the recovered plastics. For example, aldehydes, ketones or carboxylic acids produced by oxidation of additives, degraded polymer or residual monomers in the plastic can result in undesirable odors in the end product. Because of the long lifetime and multiple heat histories of the recovered plastic pieces, the amounts of these compounds and the resulting odors can be much stronger than found in virgin plastics.

Contaminant materials such as rubber, wood, high melting plastics, paint and thermosets can also be present in plastic-rich streams, and small amounts can be found in purified flakes that are processed in an extruder. Such contaminants do not melt during the extrusion process, so can end up sticking on or in screens used for melt filtration. The lifetime of these contaminants on or in melt filtration screens can be from less than one minute up to several hours, so the contaminants can at least partially degrade into semi-volatile organic chemicals. These semi-volatile organics can remain in the plastic material after the extruder die, especially if there is no devolatilization step after the melt filtration. These semi-volatile organics from degraded contaminant materials in the melt can result in porous pellets as well as unwanted odors, difficulties with melt processing, foaming of the extrudate and poor surface appearance of the plastic product.

Contaminant materials such as rubber, wood, high melting plastics, paint and thermosets can also contain volatile or semi-volatile compounds such as water or oils that can be released into the melt during processing or while the contaminants remain on or in the melt filtration screens. These volatile and semi-volatile compounds released from contaminant materials in the melt can result in porous pellets as well as unwanted odors, difficulties with melt processing, foaming of the extrudate and poor surface appearance of the plastic product.

Residual moisture present in plastics or in contaminant particles found in the plastic mixture can also result in process difficulties, with problems such as foaming of the extrudate and poor surface appearance of the plastic product.

Hydrolytic degradation of condensation polymers can also occur when moisture is present, resulting in reduced material properties and additional semi-volatile organic chemicals that can result in porous pellets as well as unwanted odors, difficulties with melt processing, foaming of the extrudate and poor surface appearance of the plastic product.

In addition to odors or environmental concerns about organic contaminant molecules in recovered plastics, the contaminants can also cause difficulties during the extrusion step. During the extrusion of HDPE recovered from ELVs, for example, residual fuels in the HDPE fuel tanks can vaporize resulting in bubble formation in pellets or other extrusion products. These bubbles result in large and low density pellets, and end products manufactured from these pellets (e.g. by injection molding or blow molding) can contain voids that result in mechanical failures in addition to having a poor surface appearance.

In the extrusion of HDPE recovered ELV, the portion of voids in pellets is not large when using vacuum devolatilization and at the beginning of the extrusion process when the melt filtration screens are newly installed and the melt temperature is kept below about 230° C. and preferably below about 210° C. When using melt filtration such as the self wiping Laser Filter melt screens from Erema Plastic Recycling Systems (Ansfelden/Linz, Austria), small fragments of non-melt particles can stick in the small holes and clog the screen over the course of several hours. As the Laser Filter screens become blocked, the melt is forced through fewer holes so the shear rate of the polymer increases. The higher shear rate results in greater shear heating so that the temperature increases and semi-volatile organics can volatilize once the melt exits the die to atmospheric pressure. These semi-volatile organics result in porous pellets as the volatilized compounds escape from the solidifying melt.

HDPE mixtures from ELV can also contain EVOH and polyamides that can degrade at high temperatures in the presence of moisture. Such degradation can result in the creation of semi-volatile organics that can become volatile after reaching atmospheric pressure, resulting in porosity in the extruded pellets.

Processes and methods to remove residual organic contaminants or to reduce the levels of organic contaminants in recovered plastic flakes are described in U.S. 61/521,461, which is hereby incorporated by reference. Such methods include heating the plastics to volatilize the organic contaminants, extraction of organic contaminants with solvents (including supercritical fluids), cleaning the organic contaminants from the polymer surface using aqueous surfactant solutions, cleaning the organic contaminants from the polymer surface using commercial cleaning equipment with or without surfactants, or heating the organic contaminants using microwaves or other radiation that preferentially heats the organic contaminants compared with the plastic itself. Organic contaminants can also be removed during the extrusion step by the use of vacuum devolatilization equipment commonly used in the plastics industry In cases where odors cannot be completely removed to the desired end point, it is possible to melt compound into the plastic activated carbon or molecular sieves to reduce the odor of the plastic product. The organic contaminant still remains in the plastic, but it is trapped such that it cannot be easily detected during the normal use of the plastic.

Calcium oxide (CaO) can further be added to the recycled plastic. For example, the CaO can be added to the recycled plastic at the extruder.

CaO can be added to plastic melts or rubber compounds where residual moisture can lead to degradation of the polymer, blistering due to boiling of the moisture, reactivity with monomers or other problems. CaO reacts with moisture to give calcium hydroxide. For each molecule of CaO that reacts, one molecule of water is consumed resulting on one molecule of calcium hydroxide. CaO is available, for example, from Omya UK Chemicals (Chaddesden, UK) under the Caloxol® tradename. In some embodiments, between 0.5% and 3% by weight of CaO is added to the polymer. In some cases, between 0.3% by weight and 1.0% by weight CaO is added to mixtures including a majority of HDPE, PP, ABS and/or HIPS.

CaO can be added in the form of powder, dispersions in oil, or in a plastic masterbatch. A masterbatch of CaO in low density polyethylene (LDPE) is available from Colloids UK (Knowsley, UK).

The addition of CaO to the polymer results reduced foaming at the extruder exit and reduced surface splay in molded or extruded parts. In addition to the CaO reacting with residual moisture in the material, the CaO can aid in the reduction of other volatiles in the material that would otherwise result in foaming of surface appearance issues.

The addition of CaO to HDPE can reduce the number and size of voids in the resulting pellets. The effect of the addition is almost immediate after the CaO is added. Example 1 describes a particular test when CaO is added to reduce the number and size of the voids in HDPE pellets. Parts injection molded or extruded from the HDPE compounded with CaO have a much better surface appearance than those prepared from HDPE that was compounded without CaO.

The amount of moisture in the HDPE flakes is not high enough to result in the type of foaming observed in the pellets, and whatever moisture was present in the flakes is expected to have been removed in the vacuum devolatilization system. The reduction in foaming may be due to the removal of residual semi-volatile organics in the flake mixture and removal of semi-volatile organics resulting from degradation of thermoplastics (such as EVOH or polyamides), thermosets (such as polyurethanes), rubber or wood during the extrusion process. Examples 2 and 3 describe results from FTIR analysis of samples with varying levels of CaO where the amounts of certain organic chemical species are reduced.

Similar results are observed in other polymers including ABS, HIPS and PP recovered from end-of-life vehicles.

Because the amount of splay found in molded ABS (without CaO added) is much higher than for other post-consumer sources of ABS (e.g. from waste electrical and electronic equipment) with similar levels of moisture, we suspect that much of the splay is not due to moisture but rather due to degradation products from materials found more commonly in ELV streams. Some types of rubber, polyurethane and polyurethane paint could be particular sources of such degradation products. Example 4 describes the degradation of non-melt materials found in a mixture of ABS flakes. It may be that at least a portion of the effect of CaO on recycled streams of HDPE, PP, ABS and HIPS is due to the removal of water delaying the degradation of contaminants such as paint, rubber, polyamides, polyurethane, EVOH and wood.

Fourier transform infrared spectroscopy (FTIR) has been used to evaluate recycled products with and without added CaO, and the results indicate that CaO results in a reduction in certain semi-volatile organics that are not necessarily related to hydrolytic degradation products. The reduction in the content of alkanes, for example, (as mentioned in Example 2) is not easily explained by the action of CaO.

The following examples illustrate the use of CaO for improving the surface appearance and processing of plastics recovered from streams of waste plastics. Other compounds such as magnesium oxide may be used of in place of or in combination with CaO to reduce the presence of volatile organics in recycled polymers. In addition, the use of acid scavengers such as stearates (including zinc, magnesium or calcium stearates) in combination with calcium and/or magnesium oxides may further reduce the presence of certain volatile organics. The resultant polymer may include hydroxides and carbonates of magnesium and/or calcium.

EXAMPLES

The following examples demonstrate the effectiveness of methods for improving the surface appearance and processing of plastics recovered from streams of waste plastics.

Example 1

Foamed Extrudate Immediately Becomes Non-Foamed when CaO Added to HDPE

HDPE recovered from end-of-life vehicles was extruded using a 75 mm twin screw extruder including a melt filtration system with 400 micron screen size and a water-ring style pelletizer.

Though primarily HDPE, the extruded polymer mixture also contained approximately 15% PP copolymer, smaller amounts of other thermoplastics such as ABS and HIPS, and thermosets including wood, rubber and polyurethane.

After a few hours of extrusion, the melt temperature increased and the pellets produced were a lower bulk density due to a higher content of voids. The extrudate also had a rough surface texture.

While the HDPE extrudate was of such a poor quality, we began adding a small amount of a CaO concentrate in LDPE. The extrudate almost immediately became more smooth and the fraction of voids in the pellets decreased.

Example 2

FTIR Analysis of PE Samples with Varying Levels of CaO

HDPE recovered from end-of-life vehicles was extruded without CaO and with 1% and 3% of Caloxol (CaO powder). The extrudate appeared much smoother with Caloxol than without. The infrared spectra of the samples were measured using FTIR with an attenuated total reflectance (ATR) accessory. The spectra were then regressed against the Caloxol concentration using a multivariate statistical analysis (MVSA). The regression spectrum is shown in FIG. 1.

The spectra of the PE sample without Caloxol reveals a region between 3264 and 3330 $cm^{-1}$ attributed to a low concentration of polyurethane decomposition products such as R—NHR (secondary amines), C(=O)NHR (amides) and symmetric R—NH2 (primary amines). The absorptions in these regions are reduced when Caloxol is added, suggesting that the Caloxol reduces the degradation of polyurethanes and removes the byproducts of the degradation.

The samples with added Caloxol both show an isolated OH absorption peak at 3643 $cm^{-1}$, which is indicative of calcium hydroxide, and a broad absorption centered around 1450 $cm^{-1}$ which is indicative of calcium carbonate.

FIG. 1 also shows changes in the CH stretch region (near 3000 $cm^{-1}$) that appear to show a loss of liquid-life paraffins. This could be related to a loss of residual diesel present in the PE. The result is that the $CH_2$ absorptions from the polyethylene are sharpened.

There is also evidence that carboxylate functional groups have reduced due to a reduction in the absorption at 1710 $cm^{-1}$.

Example 3

FTIR Analysis of HDPE Samples with Varying Levels of CaO

Figure 2:
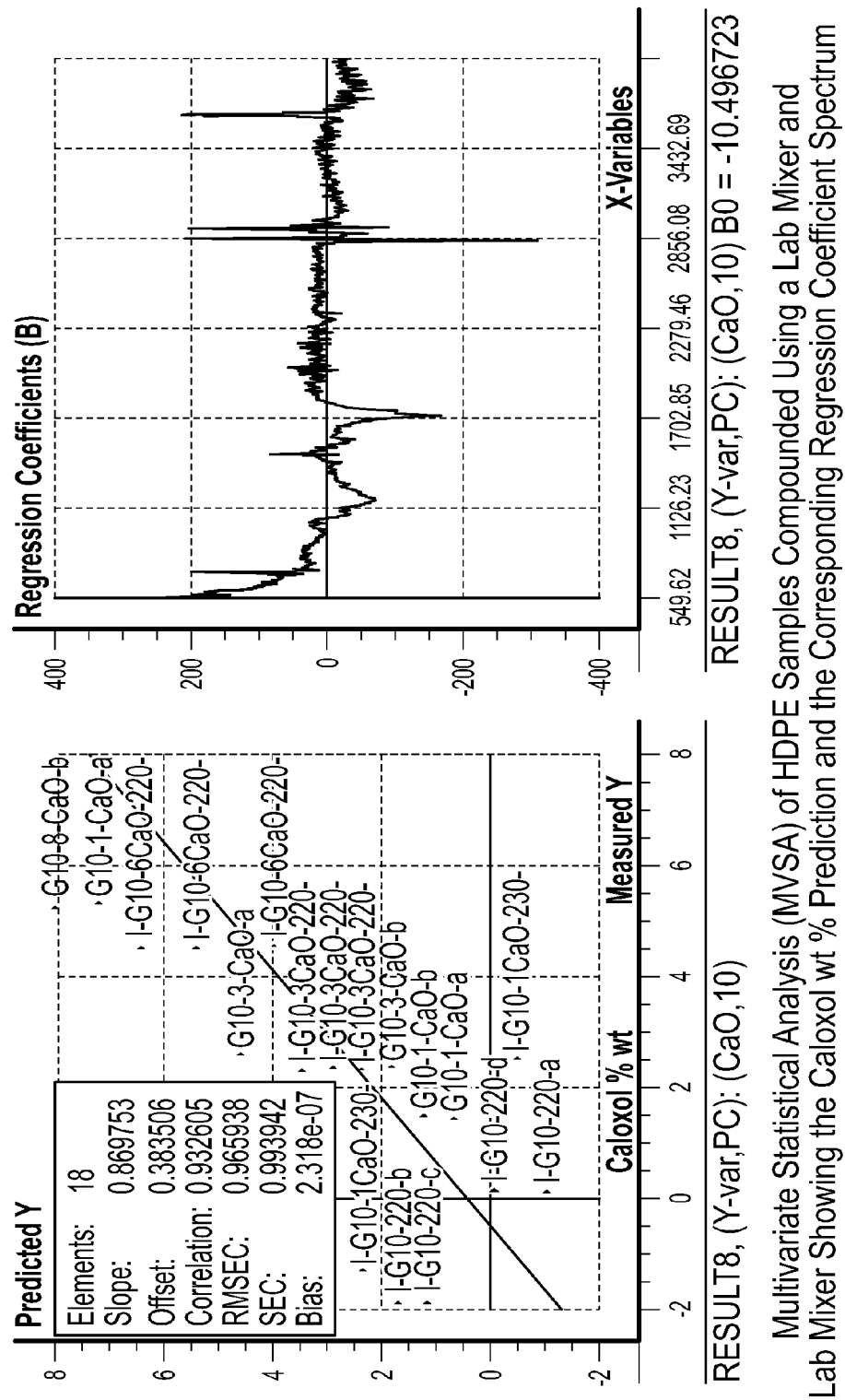
FIG. 2: Multivariate statistical analysis (MVSA) of HDPE samples compounded using a lab mixer and lab mixer showing the Caloxol wt % prediction and the corresponding regression coefficient spectrum

HDPE recovered from end-of-life vehicles was compounded with between 0 and 8 wt % Caloxol in a laboratory extruder or in a laboratory mixer. The extrusion temperature was between 220 and 230° C. FIG. 2 shows multivariate statistical analysis (MVSA) results for the HDPE samples compounded with Caloxol. The results of the MVSA show a good correlation of the spectra with Caloxol wt %.

As in Example 2 and FIG. 1, there is a correlation with the hydroxyl at 3640 $cm^{-1}$ suggesting the formation of calcium hydroxide and a change in crystallinity as seen in the sharpening of the absorptions for the CH stretches slightly below 3000 $cm^{-1}$ and the prominence of the absorption at 715 $cm^{-1}$. Also note the negative correlation with absorptions of oxidative species and EVOH, as seen by the downward bands around 1180 $cm^{-1}$ (C—O) and 1714 $cm^{-1}$ (C=O). These results suggest that the Caloxol is reducing these species.

The invention claimed is:

1. A process for reducing the content of polar organic residues in mixtures of plastics from durable goods comprising
    separating a feed stream into two or more mixtures of flakes, each mixture containing a primary plastic type, one or more additional plastic types, at least one organic substance absorbed into the one or more plastic types, and at least one or more non-melting contaminants, wherein a first mixture of flakes comprises a primary plastic type selected from the group consisting of HDPE, ABS, HIPS, or PP, wherein the first mixture of flakes comprises a contaminant selected from the group consisting of rubber, wood, thermosets, high melting thermoplastics, and combinations thereof;
    melt compounding the first mixture of flakes; and
    adding calcium oxide to first mixture of flakes prior to or during melt compounding to reduce the presence of volatile organics in the melt compounded first mixture.

2. The process according to claim 1, wherein the absorbed organic substances in at least one of the mixtures of flakes comprises polar residues from petroleum products and polymer degradation.

3. The process of claim 1, wherein the primary plastic type of at least one of the mixtures of flakes is HDPE and the one or more additional plastic types in the at least one of the mixtures of flakes is selected from the group consisting of EVOH, polyamides, and combinations thereof.

4. A process for reducing the content of polar organic residues in mixtures of plastics from durable goods comprising
    separating a feed stream into two or more mixtures of flakes, each mixture containing a primary plastic type, one or more additional plastic types, at least one organic substance absorbed into the one or more plastic types, and at least one or more non-melting contaminants, wherein a first mixture of flakes comprises a primary plastic type selected from the group consisting of HDPE, ABS, HIPS, or PP, wherein the first mixture of flakes comprises a contaminant selected from the group consisting of rubber, wood, thermosets, high melting thermoplastics, and combinations thereof;
    melt compounding the first mixture of flakes; and
    adding magnesium oxide to first mixture of flakes prior to or during melt compounding to reduce the presence of volatile organics in the melt compounded first mixture.

5. The process according to claim 4, wherein the absorbed organic substances in at least one of the mixtures of flakes comprises polar residues from petroleum products and polymer degradation.

6. The process of claim 4, wherein the primary plastic type of at least one of the mixtures of flakes is HDPE and the one or more additional plastic types in the at least one of the mixtures of flakes is selected from the group consisting of EVOH, polyamides, and combinations thereof.

7. A process for reducing the content of polar organic residues in mixtures of plastics from durable goods comprising separating a feed stream into two or more mixtures of flakes, each mixture containing a primary plastic type, one or more additional plastic types, at least one organic substance absorbed into the one or more plastic types, and at least one or more non-melting contaminants, wherein a first mixture of flakes comprises a primary plastic type selected from the group consisting of HDPE, ABS, HIPS, or PP, wherein the first mixture of flakes comprises an additional plastic type selected from polyamides, EVOH, or a combination thereof;

melt compounding the first mixture of flakes; and adding magnesium oxide, calcium oxide, or a combination thereof to first mixture of flakes prior to or during melt compounding to reduce the presence of volatile organics in the melt compounded first mixture.

8. The process of claim 7, wherein the first mixture of flakes comprises a contaminant selected from the group consisting of rubber, wood, thermosets, high melting thermoplastics, and combinations thereof.

9. The process of claim 8, wherein the absorbed organic substances in at least one of the mixtures of flakes comprises polar residues from petroleum products and polymer degradation.

10. The process of claim 7, wherein the primary plastic type of at least one of the mixtures of flakes is HDPE and the one or more additional plastic types in the at least one of the mixtures of flakes is selected from the group consisting of EVOH, polyamides, and combinations thereof.

11. The process of claim 1, wherein the primary plastic type of at least one of the mixtures of flakes is HDPE or ABS and the contaminants comprise a thermoset comprising polyurethane.

12. The process of claim 4, wherein the primary plastic type of at least one of the mixtures of flakes is HDPE or ABS and the contaminants comprise a thermoset comprising polyurethane.

\* \* \* \* \*